US009292400B1

(12) United States Patent
Rapaport et al.

(10) Patent No.: US 9,292,400 B1
(45) Date of Patent: Mar. 22, 2016

(54) SYSTEM, METHOD, AND COMPUTER PROGRAM FOR DETERMINING A NETWORK FOR A USER

(75) Inventors: Nir Rapaport, Herut (IL); Ronen David, Hertzeliya (IL)

(73) Assignee: Amdocs Software Systems Limited, Dublin (IE)

( * ) Notice: Subject to any disclaimer, the term of this patent is extended or adjusted under 35 U.S.C. 154(b) by 585 days.

(21) Appl. No.: 13/530,021

(22) Filed: Jun. 21, 2012

Related U.S. Application Data

(60) Provisional application No. 61/648,029, filed on May 16, 2012.

(51) Int. Cl.
  G06F 11/30 (2006.01)
  G06F 15/173 (2006.01)

(52) U.S. Cl.
  CPC .............. *G06F 11/30* (2013.01); *G06F 15/173* (2013.01)

(58) Field of Classification Search
  CPC ... H04L 29/08072; H04L 29/06; H04L 43/00; H04L 12/2602; H04L 41/22
  USPC ........................................ 709/224
  See application file for complete search history.

(56) References Cited

U.S. PATENT DOCUMENTS

| 7,774,842 | B2 * | 8/2010 | Mahone et al. ............... 726/22 |
| 2008/0189409 | A1 * | 8/2008 | Pitkow et al. ............... 709/224 |
| 2009/0028082 | A1 | 1/2009 | Wynn et al. |
| 2011/0179019 | A1 * | 7/2011 | Amer-Yahia et al. ......... 707/723 |
| 2012/0014332 | A1 * | 1/2012 | Smith et al. ................. 370/329 |

OTHER PUBLICATIONS

Shen, W. et al., "Cost-Function-Based Network Selection Strategy in Integrated Wireless and Mobile Networks," 21st International Conference on Advanced Information Networking and Applications Workshops, 2007, pp. 314-319.

Wang, Y. et al., "Median Based Network Selection in Heterogeneous Wireless Networks," WCNC 2009 proceedings, IEEE, 2009, pp. 1-5.

\* cited by examiner

*Primary Examiner* — Vivek Srivastava
*Assistant Examiner* — Sibte Bukhari
(74) *Attorney, Agent, or Firm* — Zilka-Kotab, PC

(57) ABSTRACT

A system, method, and computer program product are provided for determining a network for a user. In use, a network-related event associated with a user is identified. Additionally, a score is calculated for the user, in response to the identification of the event. Further, a network is determined for the user, based on the score.

18 Claims, 6 Drawing Sheets

SYSTEM, METHOD, AND COMPUTER PROGRAM FOR DETERMINING A NETWORK FOR A USER

CLAIM OF PRIORITY

This application claims the benefit of U.S. Provisional Patent Application 61/648,029, filed May 16, 2012, the entire contents of which are incorporated herein by reference.

FIELD OF THE INVENTION

The present invention relates to network access, and more particularly to managing network connections.

BACKGROUND

Communication networks have become a common medium for individuals and other entities to transmit and receive information. For example, users may check their email, purchase goods from online vendors, and make telephone and video calls utilizing a network connection. Unfortunately, conventional methods for connecting users to communication networks have exhibited various limitations.

For example, a communication network may be selected for a user based solely on the condition of the network, and may not consider factors such as the application type, a status of the user, etc. There is thus a need for addressing these and/or other issues associated with the prior art.

SUMMARY

A system, method, and computer program product are provided for determining a network for a user. In use, a network-related event associated with a user is identified. Additionally, a score is calculated for the user, in response to the identification of the event. Further, a network is determined for the user, based on the score.

DETAILED DESCRIPTION

Figure 1:
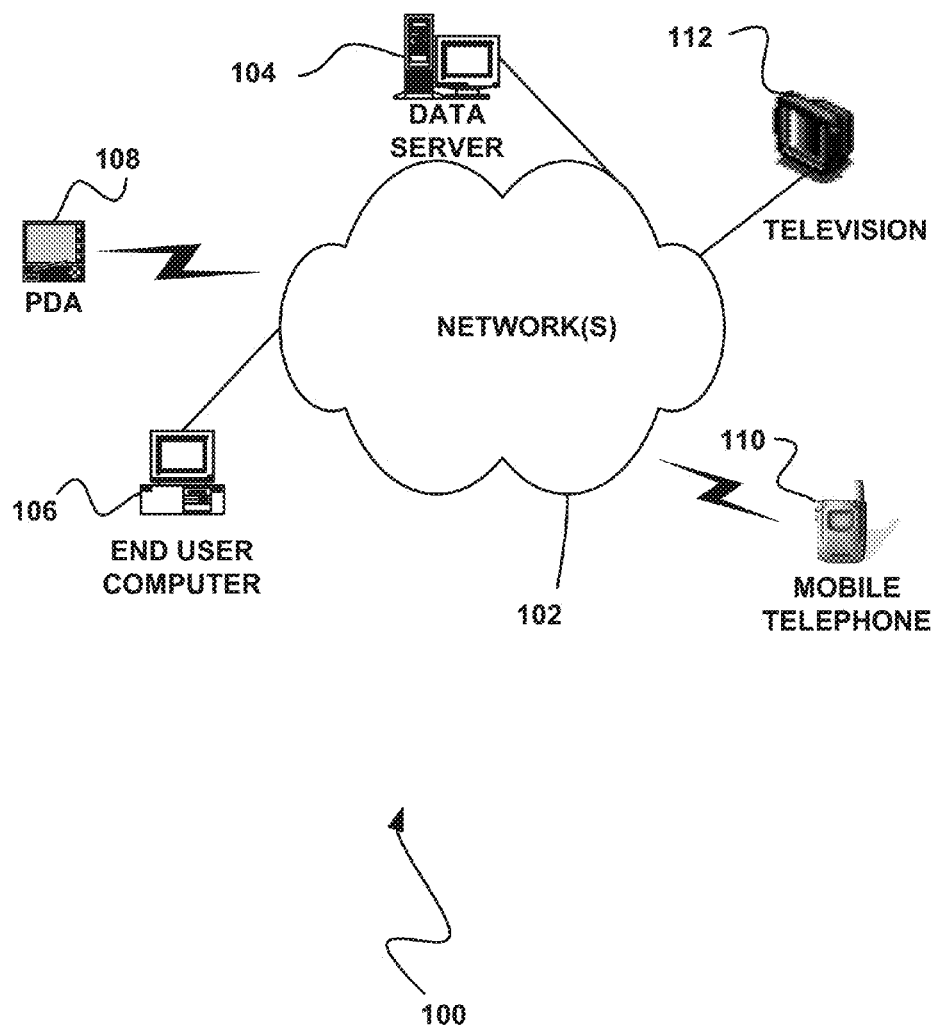
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
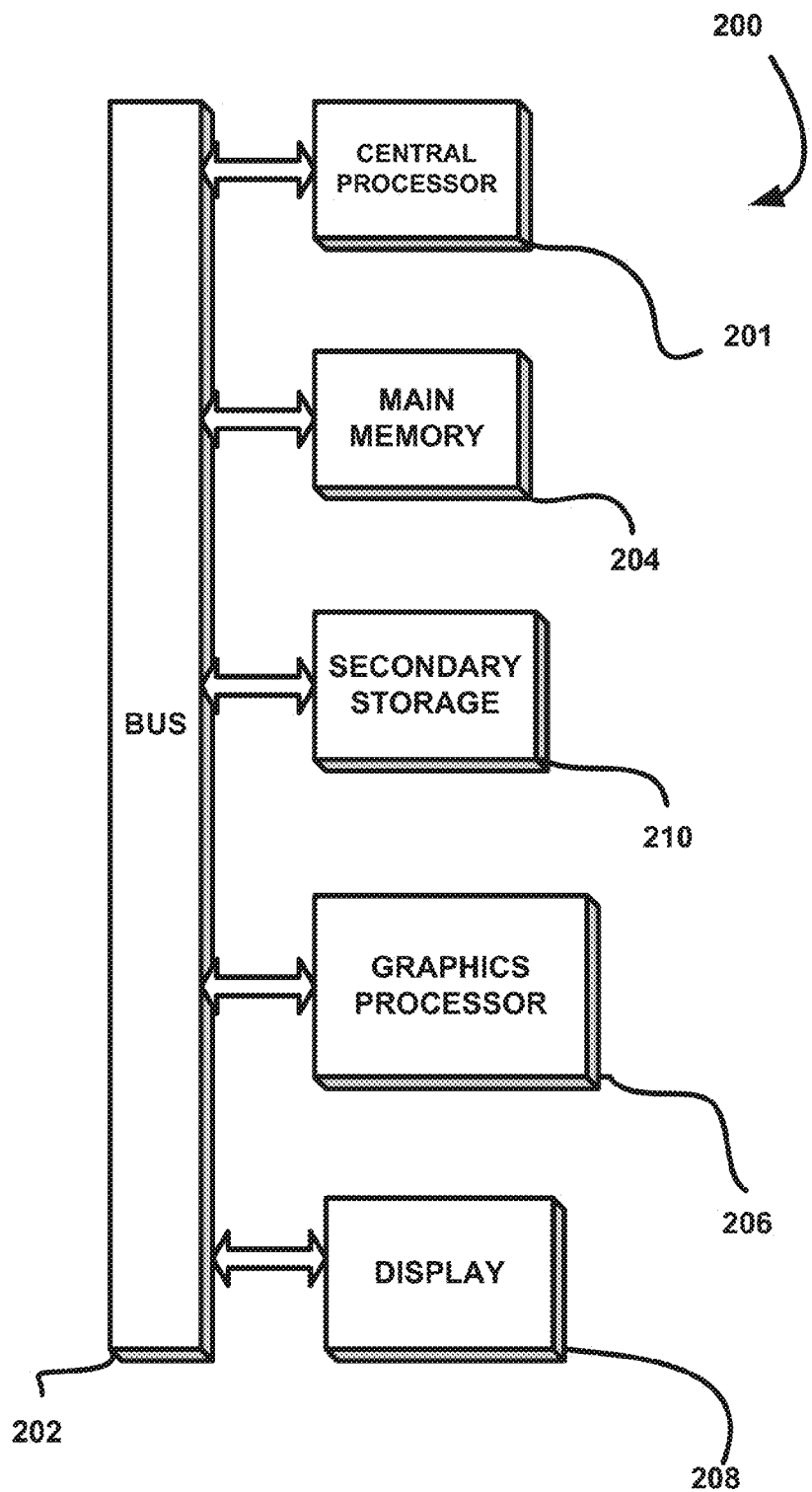
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
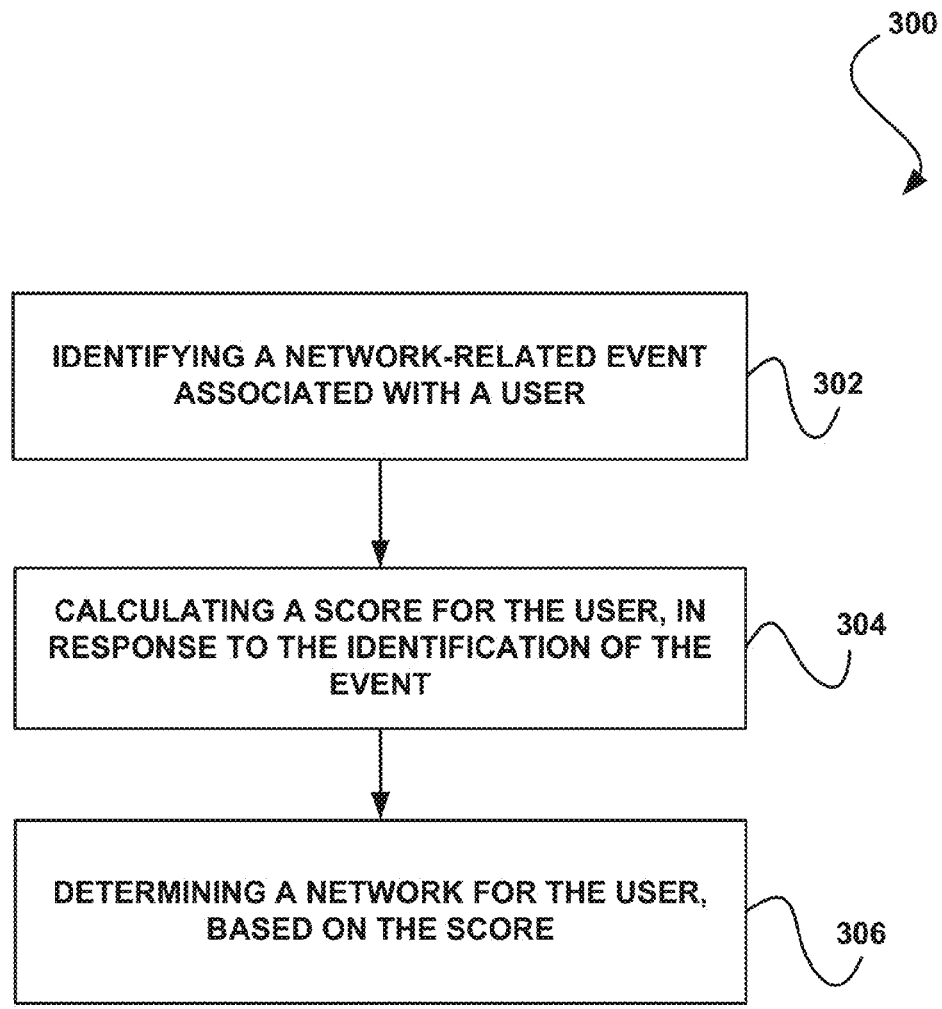
FIG. 3 illustrates a method for determining a network for a user, in accordance with one embodiment.

FIG. 3 illustrates a method 300 for determining a network for a user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a network-related event associated with a user is identified. In one embodiment, the user may include a subscriber to a one or more network services. For example, the user may include a subscriber to one or more data and/or talk services provided by a network. In another embodiment, the network services may be provided by an entity (e.g., a telecommunications provider, a network provider, etc.). In another embodiment, a network may include any type of network available to the user. For example, the network may include a telecommunications network (e.g., a wireless network, a cellular network, a satellite network, a wired network, a voice over IP (VoIP) network, etc.).

Additionally, in one embodiment, the network-related event may include a request by a device of the user to connect to a network. For example, the network-related event may include the detection of one or more existing networks by the device of the user. In another example, the network-related event may include an attempt by the device of the user to connect to one or more of the detected networks.

Further, in one embodiment, the network-related event may include a determination that the device of the user has become connected to one or more networks. For example, the network-related event may include a detection of one or more communications by the user device on one or more networks.

Further still, in one embodiment, the network-related event may include a determination that network congestion exists on a network to which the user device is currently connected. For example, the network-related event may include a notification from a network monitor that network congestion exists on the network. In another embodiment, the network-related event may include a determination that the user is nearing a quota. For example, the network-related event may include a notification from a usage monitor that the user is nearing a network usage quota (e.g., a predetermined network usage amount purchased by the user, etc.).

Also, in one embodiment, the network-related event may include a determination that one or more additional networks have become available for connection by the device of the user while the device of the user is currently connected to a network. For example, the network-related event may include an indication by a network monitor that an additional network has become available to the device of the user while the device of the user is currently transmitting and/or receiving data via another network.

In addition, in one embodiment, the network-related event associated with a user may be identified by an application on the user's device. For example, the network-related event may be identified by an offload controller (e.g., a controller that manages network selection for the user's device, etc.) installed within the user's device. In another embodiment, the network-related event associated with a user may be identified by an entity separate from the user's device (e.g., by an application installed on a device other than the user's device that is in communication with the user's device over a network, etc.).

Furthermore, as shown in operation 304, a score is calculated for the user, in response to the identification of the event. In one embodiment, one or more factors associated with the user may be used to calculate the score for the user. For example, the one or more factors may include a profile of the user. In another example, the one or more factors may include an indication as to whether the user is a prepaid or a postpaid customer of a network service provider (e.g., a provider of network services desired by the user, etc.).

Further still, in one embodiment, the one or more factors may include a type of network services package purchased by the user from the network service provider. In another embodiment, the one or more factors may include an indication as to whether the user is a heavy or light consumer of the network service provider. For example, the one or more factors may include an indication as to whether the user's usage of the network service resources provided by the provider exceeds a predetermined amount for a predetermined period of time (e.g., a day, a week, a month, a year, etc.). In another example, the one or more factors may include an indication as to whether the user's usage of the network service resources provided by the provider is within a predetermined amount from a limit associated with the services provided to the user.

Also, in one embodiment, the one or more factors may be associated with one or more networks. For example, the one or more factors may include an availability of the one or more networks. For instance, the one or more factors may include an indication as to whether one or more networks are currently available to the user, currently unavailable to the user, etc. In another embodiment, the one or more factors may include a condition of one or more networks. For example, the one or more factors may include an indication as to whether all components of a network to which the user is currently connected are currently functioning properly, or whether one or more components of the network are not currently functioning properly.

Additionally, in one embodiment, the one or more factors may include a cost associated with the one or more networks (e.g., an amount paid to the provider of the one or more networks by the user, an amount paid by the provider to provide the one or more networks, etc.). In another embodiment, the one or more factors may include an application type being run by the user. For example, the one or more factors may include an indication as to the amount of network resources required by an application currently being run by the user.

Furthermore, in one embodiment, the one or more factors may be identified by an application on the user's device. For example, an offload controller installed within the user's device may retrieve and/or receive the one or more factors. In another embodiment, the one or more factors may be identified by an entity separate from the user's device (e.g., by an application installed on a device other than the user's device that is in communication with the user's device over a network, etc.).

Further still, in one embodiment, one or more of the factors may be retrieved from one or more entities. For example, one or more of the factors may be retrieved from a customer relationship management (CRM) component, a billing component, an inventory component, a resource manager component, etc. In another embodiment, the one or more entities may be located within the user's device. In yet another embodiment, the one or more entities may be located separate from the user's device, and may be in communication with the user's device via a network.

Also, in one embodiment, one or more of the factors may be retrieved from one or more networks. For example, one or more of the factors may be retrieved from a network monitor, a network service provider, etc. In another embodiment, the score calculated for the user may include a numerical score. In another embodiment, the score may be calculated using one or more algorithms. For example, one or more algorithms may take one or more factors as input and may output the score for the user. In yet another embodiment, one or more of the factors may be weighted during the calculation of the score (e.g., based on a predetermined importance of each of the factors, etc.).

Additionally, in one embodiment, a weight (e.g., a multiplier, etc.) may be assigned to one or more of the factors. For example, a unique weight may be assigned to each of the one or more factors. In another embodiment, the weight may be assigned to the one or more factors by an application on the user's device or by an entity separate from the user's device. In this way, by utilizing the weights, a dynamic algorithm may be created that may represent one or more business needs (e.g., business needs of a service provider, etc.).

Further, as shown in operation 306, a network is determined for the user, based on the score. In one embodiment, determining the network for the user based on the score may include mapping the score to a network, utilizing a table. For example, the offload controller may store a table of user scores and available networks. Additionally, the offload controller may store the user's score in the table in association with an identifier of the user. Further, the offload controller may map the user to an available network, based on the user's score.

Further still, in one embodiment, the score calculated for the user may indicate a priority of the user with respect to network resource allocation. For example, a first user with a higher calculated score than a second user may have a higher priority during network resource allocation than the second user. In another embodiment, the first user with the higher score may be assigned to a more desirable network (e.g., a faster network, a network with a lower current load, a network with a greater throughput) than a network assigned to the second user with the lower priority. In yet another embodiment, the first user with the higher score may be assigned to a more desirable network before the second user.

Also, in one embodiment, the user may be connected to the network determined for the user. For example, an offload controller may be notified of the network determined for the user, and may connect the user to that network. In another example, the offload controller may determine the network for the user, and may connect the user to that network.

Additionally, in one embodiment, the user may be removed from one network and connected to another network, based on the score. For example, if the user is connected to a current network, and the network determined for the user based on the user's score is not the same network as the current network, the user may be disconnected from the current network and may be connected to the network determined for the user.

In this way, service providers may be able to make better informed decisions regarding network resource allocations to users. Additionally, multiple existing and future network configurations may be supported. Further, service providers may save costs associated with network allocation inefficiencies and may improve their customer's user experience.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
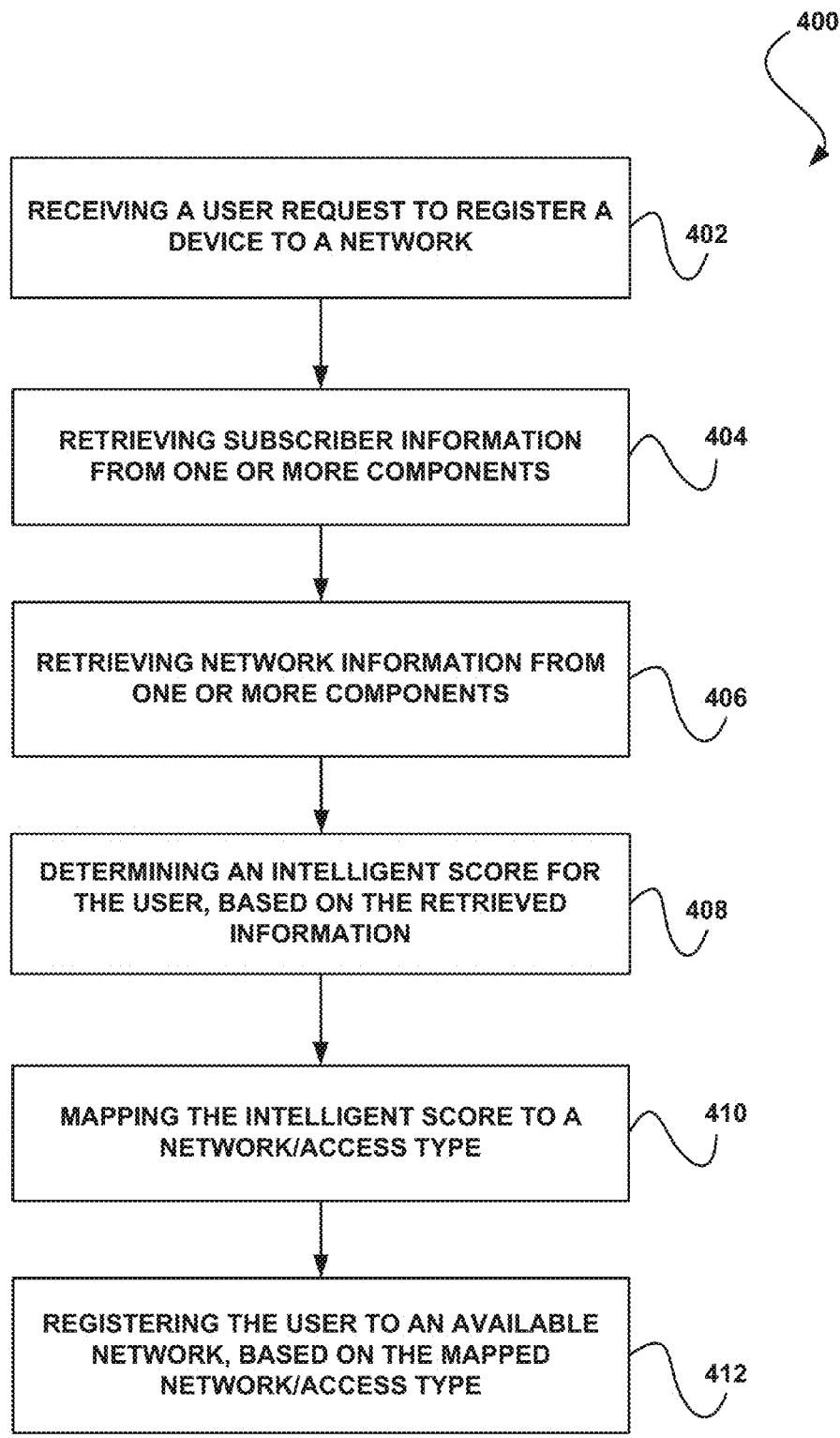
FIG. 4 illustrates a method for performing intelligent network selection, in accordance with one embodiment.

FIG. 4 illustrates a method 400 for performing intelligent network selection, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a user request to register a device of the user to a network is received. In one embodiment, the user request may be received at an offload controller. In another embodiment, the offload controller may be located within the device of the user. In another embodiment, the offload controller may be separate from the device of the user and in communication with the device of the user via a network.

Additionally, in one embodiment, the user request to register the device of the user may be sent to the offload controller upon the initialization (e.g., start-up, etc.) of the user device. In another embodiment, the user request to register the device of the user may be sent to the offload controller upon the detection of an additional network by the user device.

Further, as shown in operation 404, subscriber information is retrieved from one or more components. In one embodiment, the subscriber information may be retrieved by the offload controller. In another embodiment, the subscriber information may be retrieved by a device in communication with the offload controller. In yet another embodiment, the subscriber information may be retrieved from one or more of a CRM module, a billing module, an inventory module, a resource manager, etc.

Further still, in one embodiment, the subscriber information may include a level of consumption of network resources by the user. For example, the subscriber information may include an indication as to whether the user is a light consumer of network resources, a medium consumer of network resources, or a heavy consumer of network resources with respect to other users of network resources. In another embodiment, the level of consumption of network resources may be retrieved from a network monitor that has observed past network activity from the user's device.

Also, in one embodiment, the subscriber information may include a level of payment made for network resources by the user. For example, the subscriber information may include an indication as to whether the user has a low network payment plan, a medium network payment plan, or a high network payment plan, according to an amount of money billed to the user on a periodic basis for network services. In another embodiment, the level of payment for network resources may be retrieved from a billing manager.

In addition, as shown in operation 406, network information is retrieved from one or more components. In one embodiment, the network information may be retrieved by the offload controller. In another embodiment, the network information may be retrieved by a device in communication with the offload controller. In yet another embodiment, the network information may be retrieved from a network monitor, a network service provider, etc.

Further, in one embodiment, the network information may include current traffic within one or more networks available to the user. For example, the network information may include a level of congestion within one or more networks available to the user, inactive, damaged, or malfunctioning components of one or more networks available to the user, etc.

Further still, as shown in operation 408, an intelligent score is determined for the user, based on the retrieved subscriber information and the retrieved network information. In one embodiment, the intelligent score may include a numerical score that is determined by an algorithm that considers all or some of the retrieved subscriber information and the retrieved network information. In another embodiment, the intelligent score may be associated with a network priority. For example, a higher intelligent score for a user may correspond to a higher priority for that user when selecting an available network. In yet another embodiment, the intelligent score may be calculated by the offload controller or by a device in communication with the offload controller.

Also, as shown in operation 410, the intelligent score determined for the user is mapped to a network/access type. In one embodiment, the offload controller may include a table that maps the intelligent score to a network type and/or an access type. In another embodiment, a higher intelligent score may result in a mapping to a superior network type and/or access type when compared to a lower intelligence score.

Additionally, as shown in operation 412, the user is registered to an available network, based on the mapped network/access type. In one embodiment, the offload controller may identify the mapped network/access type for the user and may select an available network for the user based on the identified mapped network/access type. For example, if the mapped network/access type indicates that a Wi-Fi network connection is appropriate for the user, then the offload controller may register the user device to an available Wi-Fi network. Further, in one embodiment, the selected network may be communicated to the user device. In another embodiment, a connection manager component of the user device may verify a connection of the user device to the selected network.

In this way, the offload controller may manage network registration requests for users based both on the condition of available networks as well as payment and usage elements associated with each user. In one embodiment, the offload controller may include a network component that may manage network selection per user. In another embodiment, the offload controller may select from networks such as Wi-Fi, 3G, 4G, WiMax, Telco-grade WiFi, etc. Of course, however, any type of available network may be considered and/or selected in a similar manner. In yet another embodiment, the offload controller may perform one or more of offloading and onloading. In still another embodiment, one or more of the determination of the intelligent score and the mapping of the intelligent score to a network/access type may be performed in real-time, in an offline manner, etc.

Figure 5:
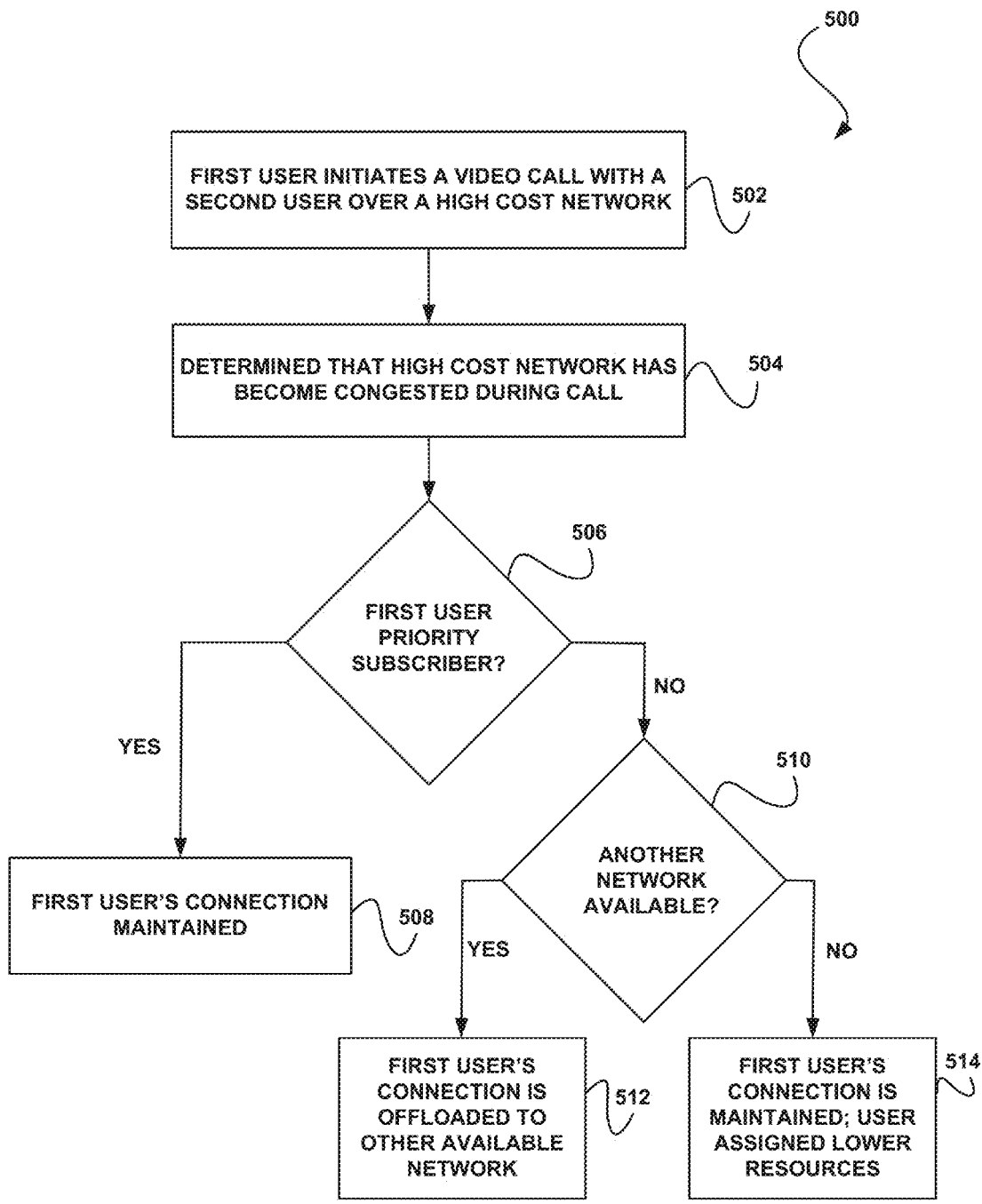
FIG. 5 illustrates a method for providing intelligent off-loading of telecommunications between users, in accordance with one embodiment.

FIG. 5 illustrates a method 500 for providing intelligent offloading of telecommunications between users, in accordance with one embodiment. As an option, the method 500 may be carried out in the context of the details of FIGS. 1-4. Of course, however, the method 500 may be carried out in any desired environment. Further, the aforementioned definitions may equally apply to the description below.

As shown in operation 502, a first user initiates a video call with a second user over a high cost network. In one embodiment, the first user may initiate a video call with the second user by inputting a phone number of the second user into a device of the first user. In another embodiment, the first user may be a subscriber to the high cost network, and such network may be provided by a service provider. In yet another embodiment, the high cost network may include a cellular network, a satellite network, etc.

Additionally, as shown in operation 504, during the call between the first user and the second user, it is determined that the high cost network used for the video call has become congested. In one embodiment, an offload controller within the first user's device may receive a notification from a network monitor monitoring the traffic on the high cost network that the high cost network has become congested, overloaded, slow, etc.

Further, as shown in decision 506, in response to the determination that the high cost network has become congested, it is determined whether the first user is a priority subscriber. In one embodiment, it may be determined whether the user has paid an additional amount over a standard network subscription rate to become a priority subscriber for the high cost network. In another embodiment, the offload controller may retrieve an indication as to whether the first user is a priority subscriber from the high cost network provider.

Further still, if it is determined in decision 506 that the first user is a priority subscriber, then in operation 508 the first user's connection over the high cost network is maintained. However, it is determined in decision 506 that the first user is not a priority subscriber, then in decision 510 it is determined whether another network is available to the first user (e.g., a lower cost network, etc.). If it is determined in decision 510 that another network is available, then in operation 512 the first user's connection over the high cost network is offloaded to the other available network. For example, the first user's connection over the cellular network may be offloaded to an available Wi-Fi network.

However, if it is determined in decision 510 that another network is not available, then in operation 514 the first user's connection over the high cost network is maintained, but the first user is assigned lower network resources for the user's session over the high cost network. In this way, priority subscribers may benefit from less congested connections over a high cost network, while non-priority subscribers may still be able to complete telecommunications on other lower-cost networks that are available.

Figure 6:
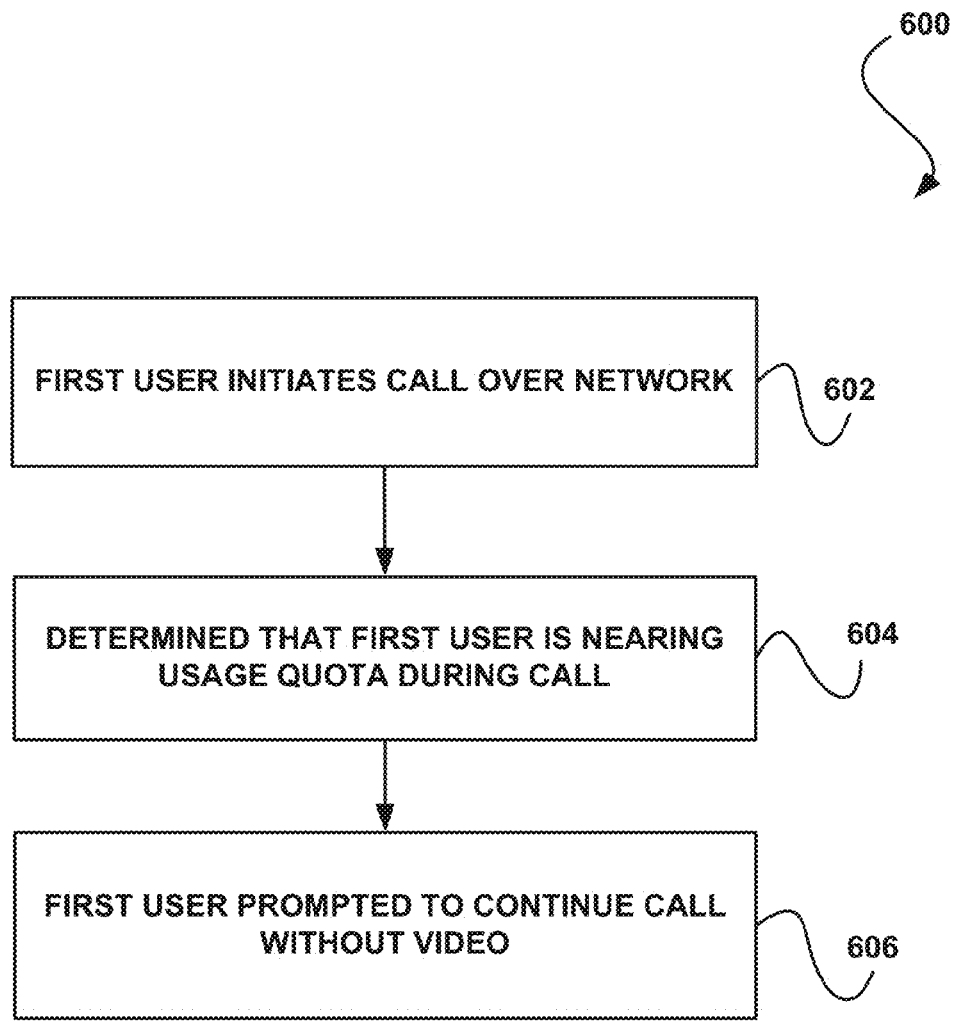
FIG. 6 illustrates a method for avoiding quota overflow during telecommunications between users, in accordance with one embodiment.

FIG. 6 illustrates a method 600 for avoiding quota overflow during telecommunications between users, in accordance with one embodiment. As an option, the method 600 may be carried out in the context of the details of FIGS. 1-5. Of course, however, the method 600 may be carried out in any desired environment. Further, the aforementioned definitions may equally apply to the description below.

As shown in operation 602, a first user initiates a video call with a second user over a network. Additionally, as shown in operation 604, during the call between the first user and the second user, it is determined that the first user is nearing their usage quota for their predetermined billing period. In one embodiment, an offload controller within the first user's device may receive a notification from a network service provider monitoring the first user's usage that the user's usage is nearing their usage quota. In another embodiment, the usage quota may include a total number of video call minutes made over the network for the first user over a predetermined time period. In yet another embodiment, the usage quota may include a total amount of data transferred over the network by the first user over a predetermined time period.

Further, as shown in decision 606, in response to the determination that the first user is nearing their usage quota for their predetermined billing period, the first user is prompted to continue the call without video in order to avoid exceeding their quota. In one embodiment, the first user may decide to continue the video call, in which case the call may be disconnected once the user's usage quota is met. In another embodiment, in response to the determination that the first user is nearing their usage quota for their predetermined billing period, the user may be prompted to extend their quota (e.g., by purchasing more data, more minutes, etc.). In this way, the first user may avoid termination of the call by switching to a type of network connection for which they do not have a quota.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable storage medium, comprising:
    computer code for identifying a network-related event associated with a user, the network-related event including:
        an initiation of communications over a first communications network by the user, and
        a determination that the first communications network has become congested;
    computer code for determining whether a predetermined priority level is associated with the user, in response to the identification of the event; and
    computer code for selecting a network for the user, based on the determining, including:
        maintaining the communications of the user over the first communications network upon determining that the predetermined priority level is associated with the user,
        upon determining that the predetermined priority level is not associated with the user:
            determining whether a second communications network is available to the user,
            offloading the communications of the user to the second communications network, upon determining that the second communications network is available to the user, and
            maintaining the communications of the user over the first communications network and assigning the user a lower amount of network resources over the first communications network, upon determining that the second communications network is not available to the user.

2. The computer program of claim 1, wherein the network-related event includes a notification from a usage monitor that the user is nearing a network usage quota.

3. The computer program of claim 1, wherein the network-related event includes a determination that one or more additional networks have become available for connection by a device of the user while the device of the user is currently connected to a network.

4. The computer program of claim 1, further comprising calculating the score for the user, utilizing one or more factors.

5. The computer program of claim 4, wherein the one or more factors include a profile of the user.

6. The computer program of claim 4, wherein the one or more factors include an indication as to whether the user is a prepaid or a postpaid customer of a network service provider.

7. The computer program of claim 4, wherein the one or more factors include a type of network services package purchased by the user from a network service provider.

8. The computer program of claim 4, wherein the one or more factors include an indication as to whether the user is a heavy or light consumer of a network service provider.

9. The computer program of claim 4, wherein the one or more factors include a condition of one or more networks.

10. The computer program of claim 4, wherein the one or more factors include a cost associated with the one or more networks.

11. The computer program of claim 4, wherein the one or more factors include an application type being run by the user.

12. The computer program of claim 4, further comprising mapping the score to a network, utilizing a table.

13. The computer program of claim 4, wherein the score calculated for the user indicates a priority of the user with respect to network resource allocation.

14. The computer program of claim 13, wherein a first user with a higher calculated score than a second user has a higher priority during network resource allocation than the second user.

15. The computer program of claim 1, wherein offloading the user to the second network includes connecting the user to the second network.

16. A method, comprising:
  identifying a network-related event associated with a user, the network-related event including:
    an initiation of communications over a first communications network by the user, and
    a determination that the first communications network has become congested;
  determining whether a predetermined priority level is associated with the user, in response to the identification of the event; and
  selecting a network for the user, based on the determining, including:
    maintaining the communications of the user over the first communications network upon determining that the predetermined priority level is associated with the user,
    upon determining that the predetermined priority level is not associated with the user:
      determining whether a second communications network is available to the user,
      offloading the communications of the user to the second communications network, upon determining that the second communications network is available to the user, and
      maintaining the communications of the user over the first communications network and assigning the user a lower amount of network resources over the first communications network, upon determining that the second communications network is not available to the user.

17. A system, comprising:
a processor for:
identifying a network-related event associated with a user, the network-related event including:
  an initiation of communications over a first communications network by the user, and
  a determination that the first communications network has become congested;
determining whether a predetermined priority level is associated with the user, in response to the identification of the event; and
selecting a network for the user, based on the determining, including:
  maintaining the communications of the user over the first communications network upon determining that the predetermined priority level is associated with the user,
  upon determining that the predetermined priority level is not associated with the user:
    determining whether a second communications network is available to the user,
    offloading the communications of the user to the second communications network, upon determining that the second communications network is available to the user, and
    maintaining the communications of the user over the first communications network and assigning the user a lower amount of network resources over the first communications network, upon determining that the second communications network is not available to the user.

18. The system of claim 17, wherein the processor is coupled to memory via a bus.

* * * * *